(12) United States Patent
Roy

(10) Patent No.: US 6,494,658 B1
(45) Date of Patent: Dec. 17, 2002

(54) CORROSION-RESISTING PROTECTOR CAP

(76) Inventor: Guy L. Roy, 2617 Rippee Rd., Tall, FL (US) 32303

( * ) Notice: Subject to any disclaimer, the term of this patent is extended or adjusted under 35 U.S.C. 154(b) by 0 days.

(21) Appl. No.: 09/814,615

(22) Filed: Mar. 23, 2001

(51) Int. Cl.⁷ .......................... F16B 37/00; F16B 19/00; F16B 37/14

(52) U.S. Cl. .................. 411/428; 411/372.5; 411/431; 411/910

(58) Field of Search .................. 411/372.5, 372.6, 411/377, 428, 429, 431, 910

(56) References Cited

U.S. PATENT DOCUMENTS

| | | | | |
|---|---|---|---|---|
| 5,028,093 A | * | 7/1991 | Nason | 411/428 X |
| 6,135,691 A | * | 10/2000 | Nadarajah et al. | 411/428 X |
| 6,273,658 B1 | * | 8/2001 | Patterson et al. | 411/428 X |

FOREIGN PATENT DOCUMENTS

GB 2079884 * 1/1982 ................. 411/428

* cited by examiner

Primary Examiner—Neill Wilson
(74) Attorney, Agent, or Firm—J. Wiley Horton

(57) ABSTRACT

A device for protecting threaded shafts and nuts against corrosion. The device covers and protects a nut and the exposed portion of a threaded shaft from corrosion found in harsh environments by holding grease in place over the nut and shaft.

3 Claims, 11 Drawing Sheets

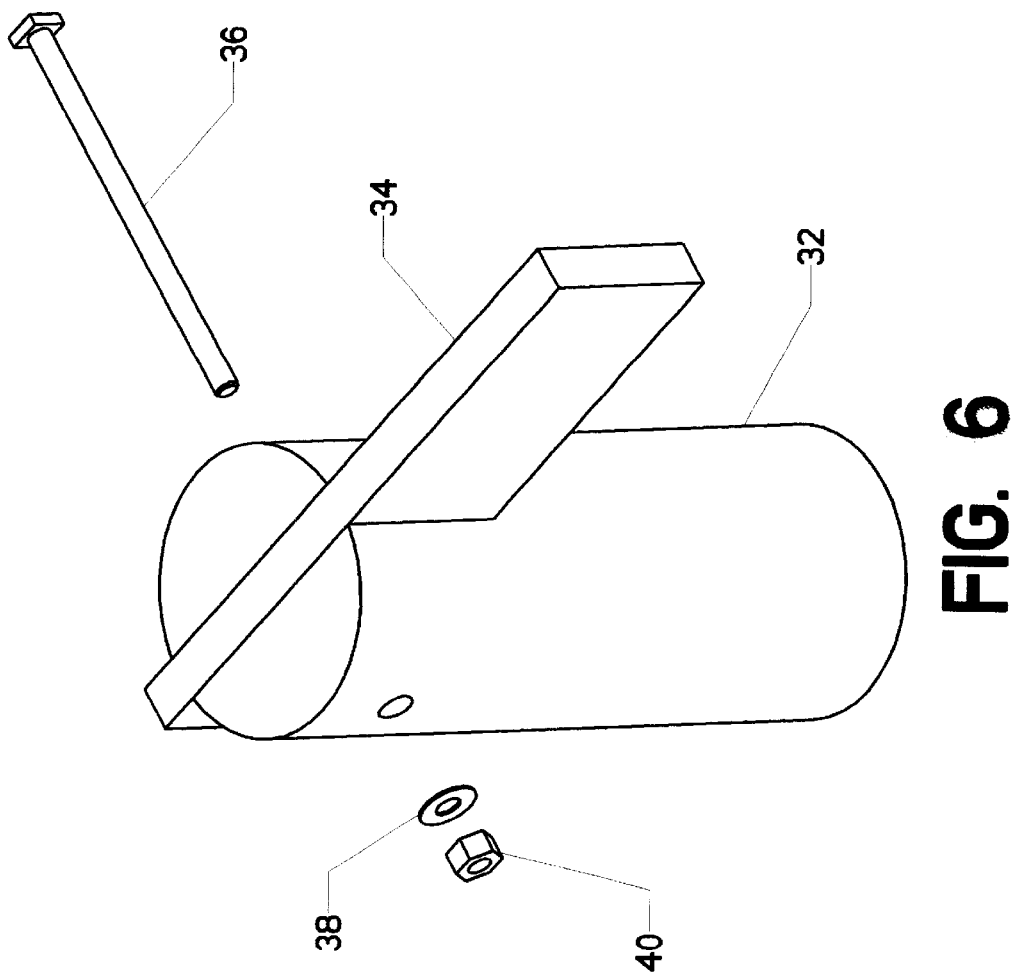

CORROSION-RESISTING PROTECTOR CAP

BACKGROUND—Field of Invention

This invention relates to the field of fastenings made by nuts and threaded shafts. More specifically, the invention comprises a device which covers and protects a nut and exposed portion of a threaded shaft from corrosion found in harsh environments—such as saltwater immersion. The device substantially inhibits rusting of the nut itself and the exposed portion of the threaded shaft extending beyond the nut, allowing the nut to be easily removed even after it has been left in place for some time.

BACKGROUND—Description of Prior Art

Lug nut protective device are well known in the prior art. Many of these protective devices are theft deterrents. One such invention is disclosed in U.S. Pat. No. 4,521,146 to Wharton (1985). The Wharton patent discloses a wheel nut cover having threads which strip upon tightening to create a tamper-resistant assembly. A similar device is disclosed in U.S. Pat. No. 4,786,224 to Wharton (1988). The '224 device includes a protective shroud which fractures upon tightening, creating a similar tamper-resistant assembly.

A device having similar objectives is disclosed in U.S. Pat. No. 4,824,305 to McCauley (1989). The McCauley device actually substitutes a different type of lug nut for the standard type found on most automobile and trailer wheels. The lug nut has an internal cavity in a special shape configured to receive a special type of removing tool. Without the tool, it is very difficult to remove the lug nut.

A simpler type of device is disclosed in U.S. Pat. No. 4,890,967 to Rosenbaum (1990). The Rosenbaum device is not primarily concerned with theft deterrence. Instead, its focus is to protect the lug stud and lug nut from corrosion. It attempts to accomplish this via covering the lug bolt's exposed surfaces (although the Rosenbaum disclosure illustrates a lug bolt, it appears to be equally applicable to the more common arrangement of a lug stud and lug nut). While somewhat effective for warding off salt sprays and other corrosive environments, the '967 device provides no positive seal to prevent water leaking into the cover upon immersion. As will be explained subsequently, water immersion is a significant concern.

U.S. Pat. No. 5,380,070 (1995) discloses a domed plastic lug nut cover. Its stated purpose is to allow the securing of a wheel cover ("hub cap") to a wheel without removing the lug nuts. The device actually threads onto the exposed portion of a lug stud. Of course, since many lug studs do not have threads extending past the lug nut, the '070 device will not work in many applications. In addition, like the Rosenbaum device, the '070 device has no positive seal to prevent water leaking into the cover upon immersion.

U.S. Pat. No. 5,810,532 to Huang (1998) discloses another domed plastic lug nut cover. This particular device uses pliable spring clips to secure itself to a lug nut. While potentially effective for one size of lug nut, different size clips would be required to accommodate the wide variety of lug nuts presently on the market. In addition, the Huang device also lacks any type of positive seal to prevent water penetration.

Another domed plastic cover is disclosed in U.S. Pat. No. 5,857,818 to Bias (1999). This device uses the pliable nature of the material itself to frictionally engage and hold itself to the hexagonal side walls of a lug nut. Obviously, the device must be sized to fit a particular lug nut, raising the same concerns as seen for the Huang device. It also lacks any type of water seal.

The lack of a water seal is a significant concern, especially where the device is to be used on boat trailer lug nuts. The lug nuts on boat trailers are always immersed completely in water when launching and retrieving a boat. If water is able to invade a protective lug nut covering, it will often remain trapped there for several hours. This phenomenon causes significant corrosion, especially when the lug nut has been immersed in salt water.

In addition, the protection of a nut locked on a threaded shaft obviously has applications far beyond the automotive industry. Many coastal installations have nuts and threaded shafts exposed to a salt air environment. These typically become rusted and inoperable in a matter of months. Accordingly, the protection of a nut locked on a threaded shaft is a desirable objective.

The known devices for accomplishing this goal are limited in that they:

1. Must be particularly adapted to fit a specific nut;
2. Must be able to thread onto an exposed portion of the threaded shaft;
3. Require the use of springs or specialized tools to lock them in place; and
4. Do not effectively protect against corrosion, especially following water immersion.

OBJECTS AND ADVANTAGES

Accordingly, several objects and advantages of the present invention are to provide a protective nut cover which:

1. Will accommodate a wide variety of nuts and shafts;
2. Does not require an exposed portion of thread to be held in place;
3. Does not require the use of springs or specialized tools to be locked in place; and
4. Effectively protects against corrosion, especially following water immersion.

DRAWING FIGURES

FIG. 6 is an exploded isometric view showing a carriage bolt attaching a joist to a piling.

REFERENCE NUMERALS IN DRAWINGS

Figure 1:
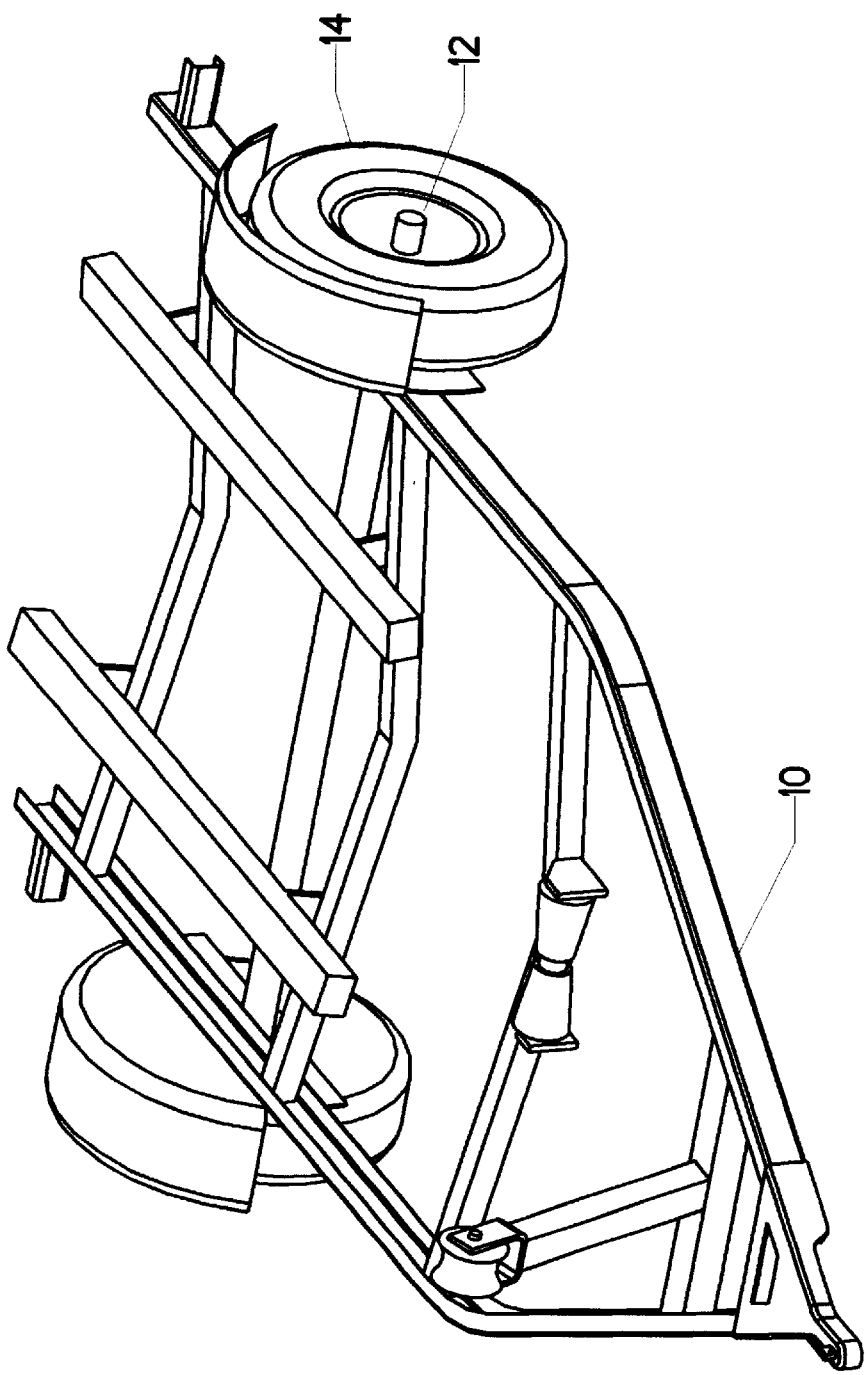
FIG. 1 is an isometric view, showing a boat trailer.

10 trailer
12 wheel 14 tire
16 lug stud
18 lug nut
20 protector cap
24 opening
26 inner portion
28 outer portion
30 grease
32 piling
34 joist
36 carriage bolt
38 washer
40 nut
42 unified protector cap

DESCRIPTION OF THE INVENTION

Figure 2:
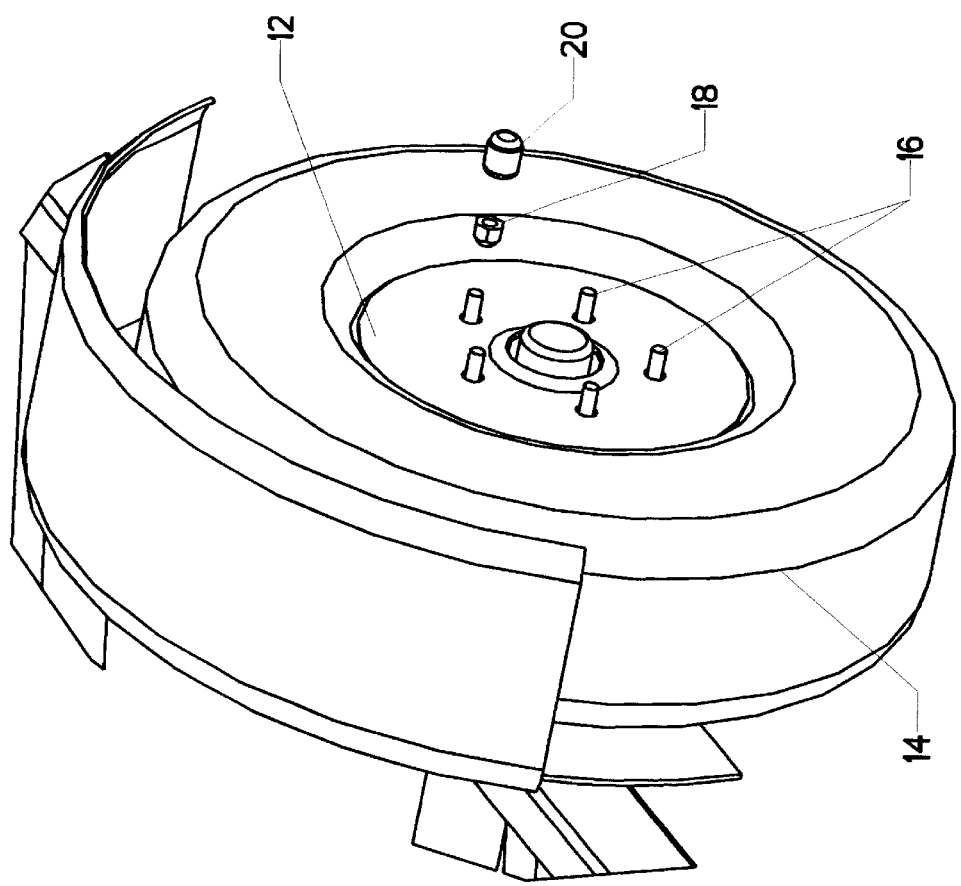
FIG. 2 is a close-up view of the trailer wheel shown in FIG. 1.

FIG. 1 illustrates a typical boat trailer 10. Boat trailer 10 has at least one pair of wheels 12 and tires 14. FIG. 2 illustrates the method of attaching wheel 12 in more detail. Tire 14 is customarily mounted on wheel 12. Wheel 12 has a plurality of holes positioned to fit over lug studs 16 (which are attached to the rotating portion of the trailer's axle). Once wheel 12 is positioned with its mounting holes over lug studs 16, a plurality of lug nuts 18 are threaded onto lug studs 16 in order to secure wheel 12 in place. Those skilled in the art will know that lug studs 16 have external threads and lug nuts 18 have corresponding internal threads. For purposes of visual clarity, these threads have not been illustrated.

When a lug nut 18 is tightened, a small threaded length of lug stud 16 will typically protrude beyond lug nut 18. Those skilled in the art will readily appreciate the fact that lug nuts and lug studs on boat trailers endure a particularly hostile environment. Returning briefly to the trailer shown in FIG. 1, the reader will appreciate that in order to launch or recover a boat both wheels 12 must be immersed in water for extended periods of time. This immersion causes corrosion of lug nut 18 and the exposed portion of lug stud 16. The problem is particularly acute for saltwater operations, where significant corrosion can occur in a matter of hours.

Water immersion often causes the internal threads of lug nut 18 to rust and thereby bond with the external threads of lug stud 16. If this process is allowed to continue, removal of lug nut 18 can become impossible. Many users seek to remedy this problem by heavily greasing both lug stud 16 and lug nut 18. Unfortunately, once the boat is recovered and the trailer proceeds down the highway, centrifugal forces generated in the rapidly spinning wheel tend to throw any applied grease off the surfaces needed protection. Thus, in order to be effective, the grease must be constantly reapplied. The present invention seeks primarily to eliminate this problem.

Returning now to FIG. 2, the reader will observe protector cap 20 in position to be pushed over lug nut 18. In normal operation, lug nut 18 would be secured in place. Protector cap 20 is then slipped over lug nut 18. It is not necessary to loosen lug nut 18. Protector cap 20 can be applied with lug nut 18 already tightened. A protector cap 20 is needed for each lug nut 18. In the particular example shown, five protector caps 20 are needed.

Figure 3:
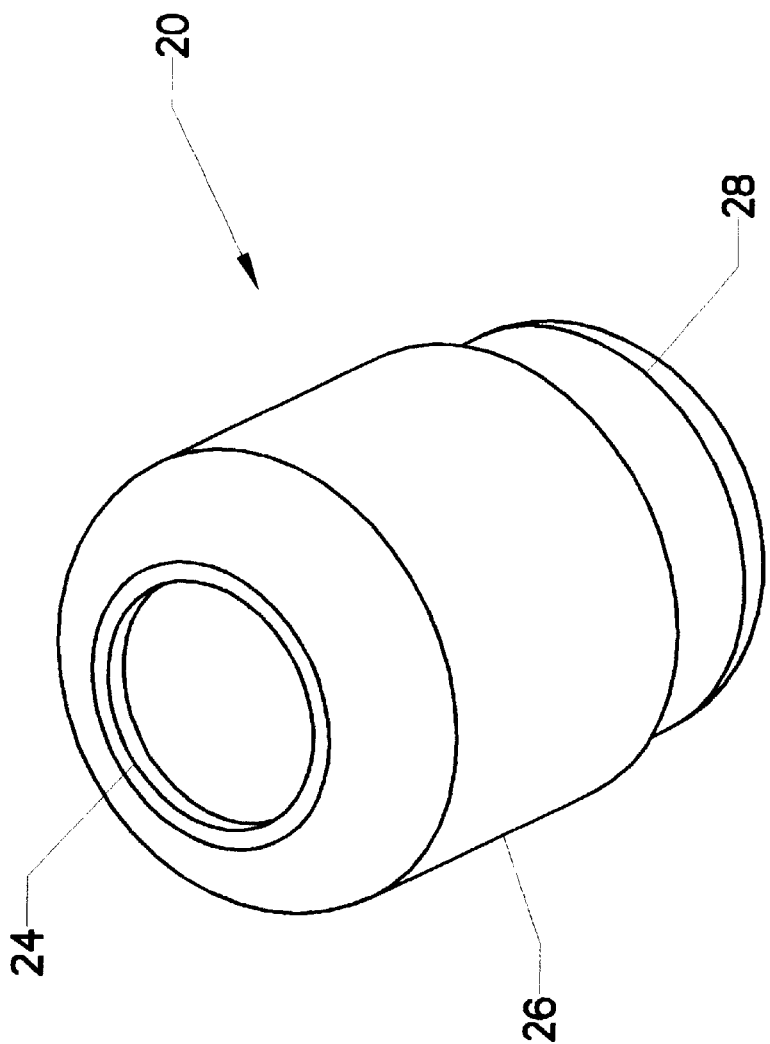
FIG. 3 is an isometric view of the proposed invention.

FIG. 3 shows protector cap 20 in greater detail. For the particular example shown, it is comprised of inner portion 26 and outer portion 28. The near end of inner portion 26 opens into opening 24. Opening 24 is made significantly smaller than the nut protector cap 20 is intended to cover. The use of pliable material for protector cap 20 allows opening 24 to expand over a particular nut and frictionally hold protector cap 20 in place.

Figure 4:
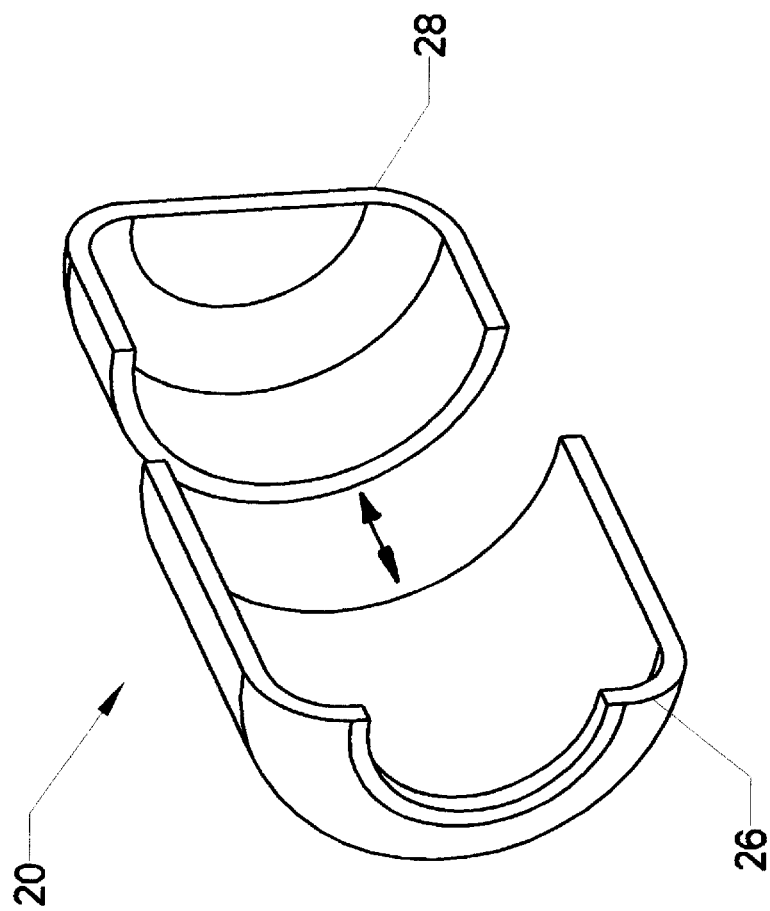
FIG. 4 is an isometric view with cutaways, showing internal details of the proposed invention.

FIG. 4 shows a cutaway view of both inner portion 26 and out portion 28. The reader will observe that both portions are thin-walled hollow structures. They are sized to be slipped together as indicated by the arrows. Both portions are made from pliable, high-friction materials so they can frictionally engage and hold each other together. Molding rubber is one example of an appropriate material for the two portions. Of course, protector cap 20 can also be made as a single piece. However, the use of two pieces allows the user to easily adjust the overall length of the device in order to accommodate varying lengths of shafts and nuts.

Figure 5:
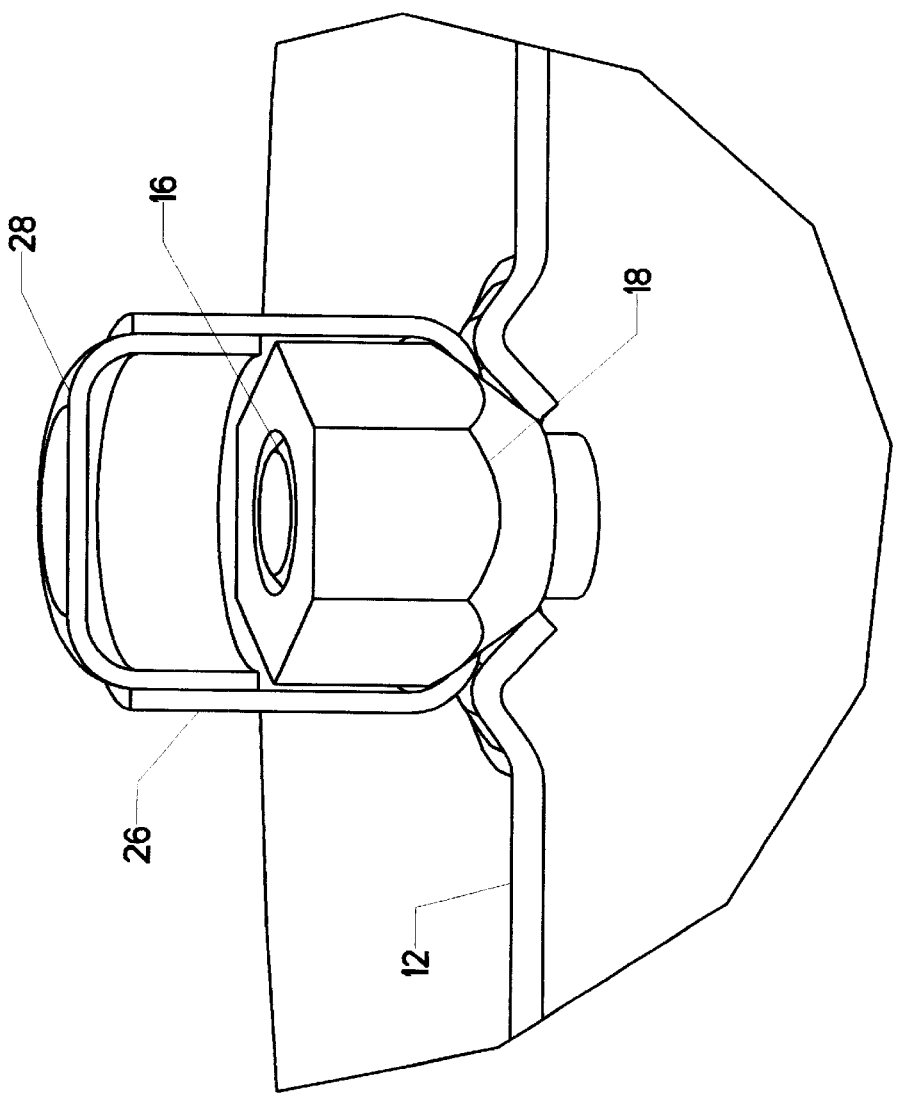
FIG. 5 is an isometric view with cutaways, showing the proposed invention in place on a lug nut.

FIG. 5 is another cutaway view showing lug nut 18 tightened in place on lug shaft 16 (rotated upright for visual clarity). Portions of wheel 12, inner portion 26 and outer portion 28 have been cut away to aid visualization. The reader will observe how inner portion 26 slips over and frictionally engages lug nut 18 (opening 24 is difficult to see in the view, but it is found at the lowest extreme of inner portion 26). The reader will also observe how protector cap 20 can be placed over lug nut 18 without having to loosen lug nut 18.

In the particular example illustrated, lug shaft 16 does not protrude beyond lug nut 18. Those skilled in the art will appreciate that many types of lug shafts do extend significantly beyond the lug nuts. The excess volume within protector cap 20 allows for this variation.

Figure 5B:
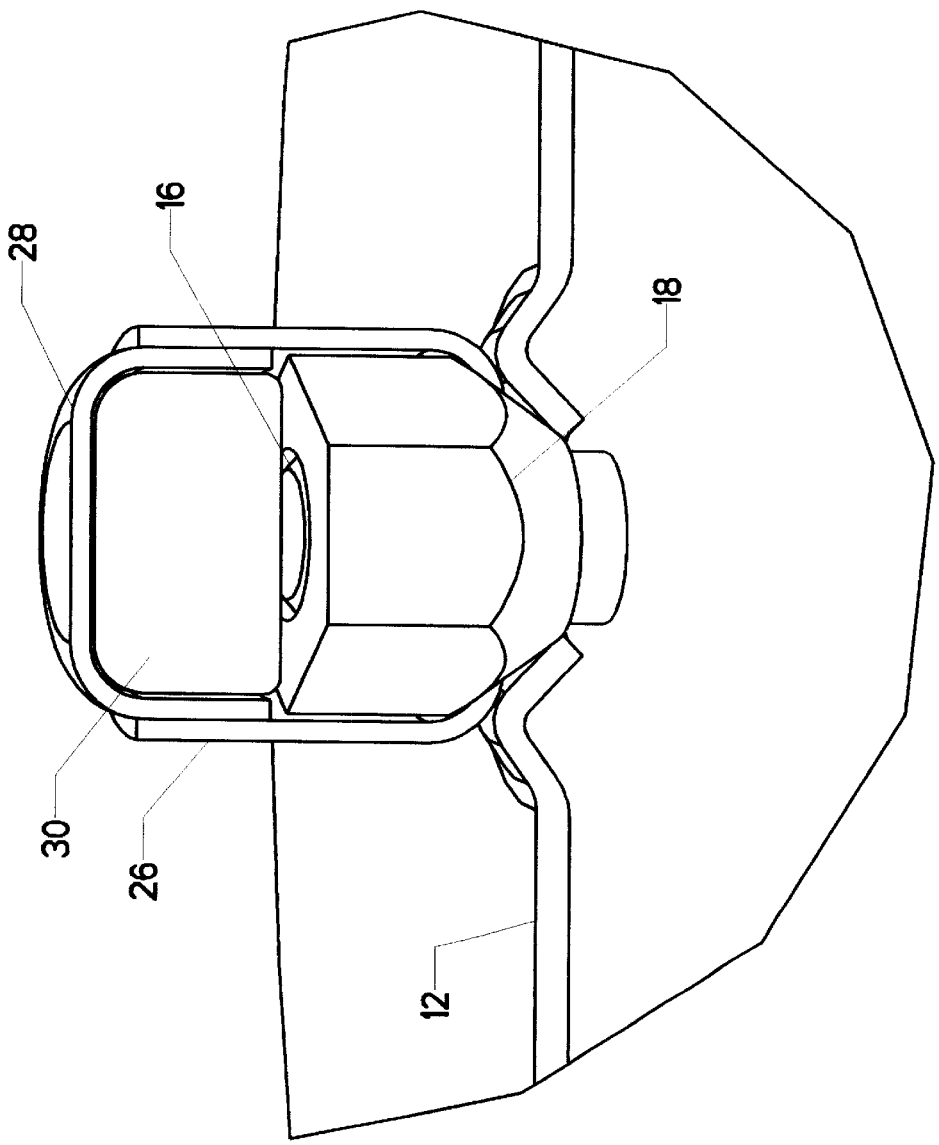
FIG. 5B is an isometric view with cutaways, showing the grease in the internal cavity of the proposed invention.

While protector cap 20 is held securely in place as shown, it is not capable of excluding water and other contaminants without an added component. FIG. 5B illustrates this added component. The excess volume within protector cap 20 is filled with viscous grease 30 (shown in a cutaway view, like the other components in FIG. 5B). Grease 30 is actually inserted into protector cap 20 before it is placed over lug nut 18. When protector cap 20 is pushed into place, grease 30 is forced down and around lug nut 18 and lug shaft 16. The user can press outer portion 28 into inner portion 26 in order to displace more grease if needed. This is generally done until a small amount of grease actually flows out of opening 24, thereby ensuing that the interior of protector cap 20 si completely bathed in grease.

Many different types of grease can be used. Marine greases, which are typically formulated to resist water absorption, are particularly effective. Clear silicone greases also work quite well. Any type of highly viscous liquid which does not permit air and water to contact the metal surfaces of lug nut 18 and lug shaft 16 will suffice. Even substances which cure and become pliable solids may be used—such as blue "RTV" silicone.

Once grease 30 is placed within protector cap 20 and protector cap 20 is installed, it can remain in place indefinitely. It is not necessary to replace grease 30 very often. Normal road use of the trailer will not loosen protector cap 20 and will not tend to displace the grease.

Figure 6B:
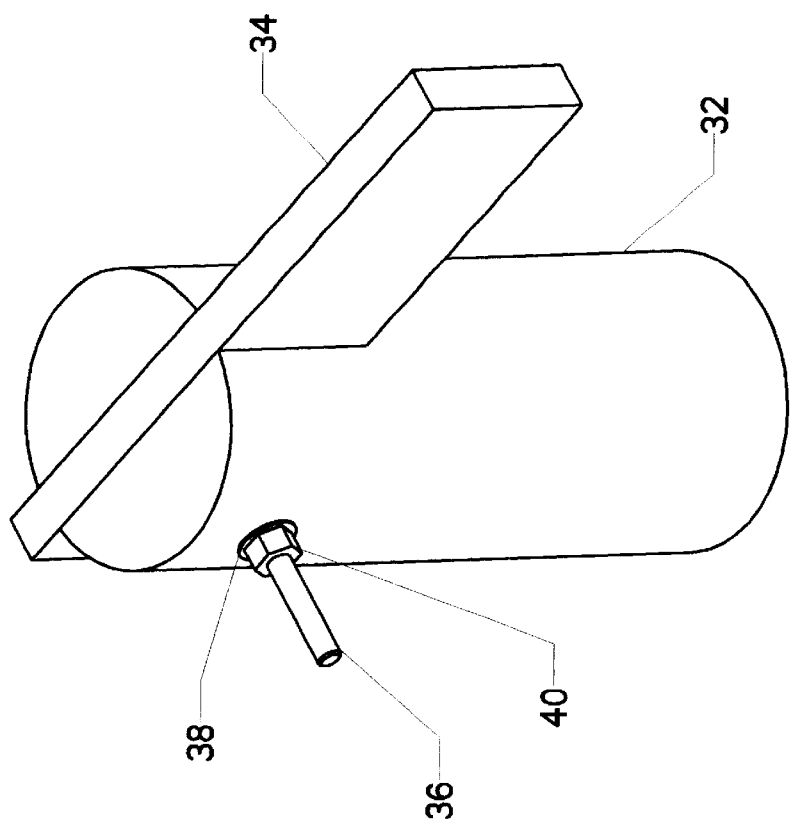
FIG. 6B is an isometric view showing the same components as FIG. 6.

Although the use of protector cap 20 on an automotive lug nut is a good application, it by no means constitutes the extent of the device's usefulness. Protector cap 20 can be used to protect any nut placed on a threaded shaft. The invention's application to a completely separate industry is illustrated in FIG. 6. FIG. 6 shows a wooden piling 32 with a transverse notch cut into its top. Joist 34 is placed into this transverse notch. Both piling 32 and joist 34 have a hole bored through them to accept carriage bolt 36. Carriage bolt 36 is placed within the hole and secured by washer 38 and nut 40, as shown in FIG. 6B.

This type of installation is typical in coastal home construction. Pilings are generally required for building on sand. The floor joists are then secured to the pilings in the manner depicted in FIG. 6. The same type of fastening is used for docks, ramps, and all sorts of other wooden structures. Unfortunately, once nut 40 is locked in place, the exposed portion of carriage bolt 36 and nut 40 rapidly begin to corrode. This corrosion often makes nut 40 impossible to subsequently remove. Worse still, the corrosion can advance to the point of rusting the bolt in two.

Figure 6C:
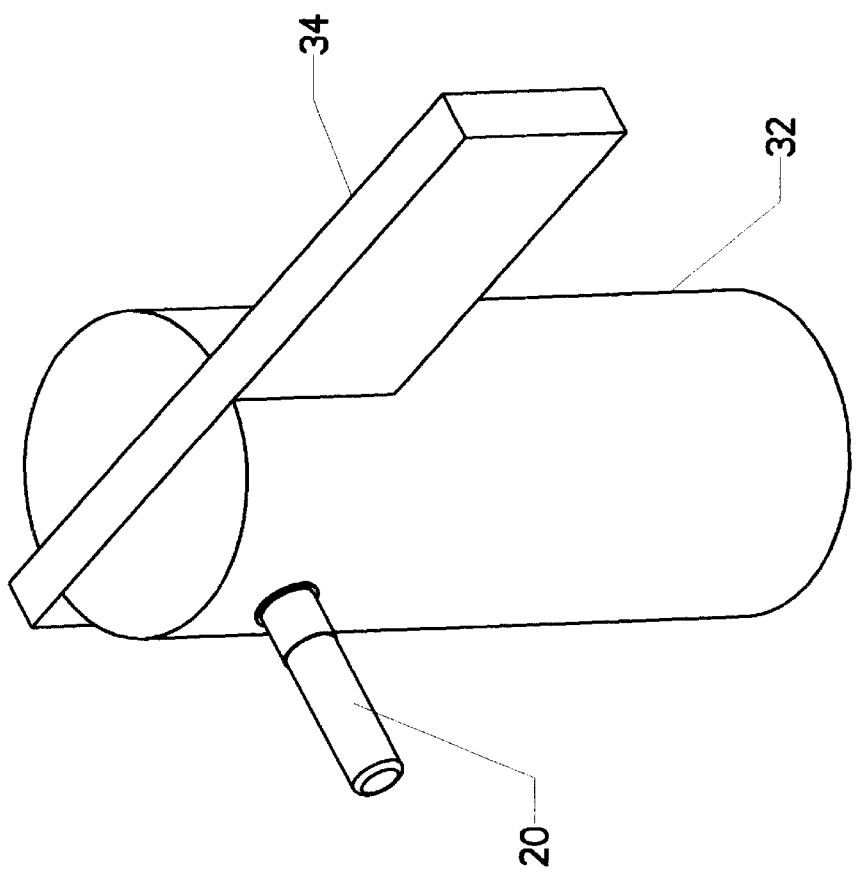
FIG. 6C is an isometric view showing the proposed invention in place on the carriage bolt shown in FIG. 6.

FIG. 6C shows an elongated version of protector cap 20 in place on the exposed portion of carriage bolt 36 and nut 40. As in the automotive application, the hollow interior of protector cap 20 is filled with highly viscous grease.

Protector cap 20 is capable of protecting virtually any nut threaded onto an exposed shaft (allowing for different sizes, of course). The use of protector cap 20 significantly inhibits corrosion, allowing the nut to be easily removed from the shaft many years after it is installed. Additional applications for protector cap 20 would include automotive suspension fastenings, axle shackle bolts, boat hardware, bridge fastenings, etc.

A two-piece protector cap 20 has been illustrated, and this version is particularly suited to situations where the length of the exposed shaft is unknown. FIG. 6C is one such situation. As protector cap 20 is made of a pliable material which can be cut with a knife, the user simply cuts outer portion 28 to the desired length. However, the reader can easily appreciate that a one-piece protector cap would be simpler and more convenient for those occasions where the required length is known.

Figure 7:
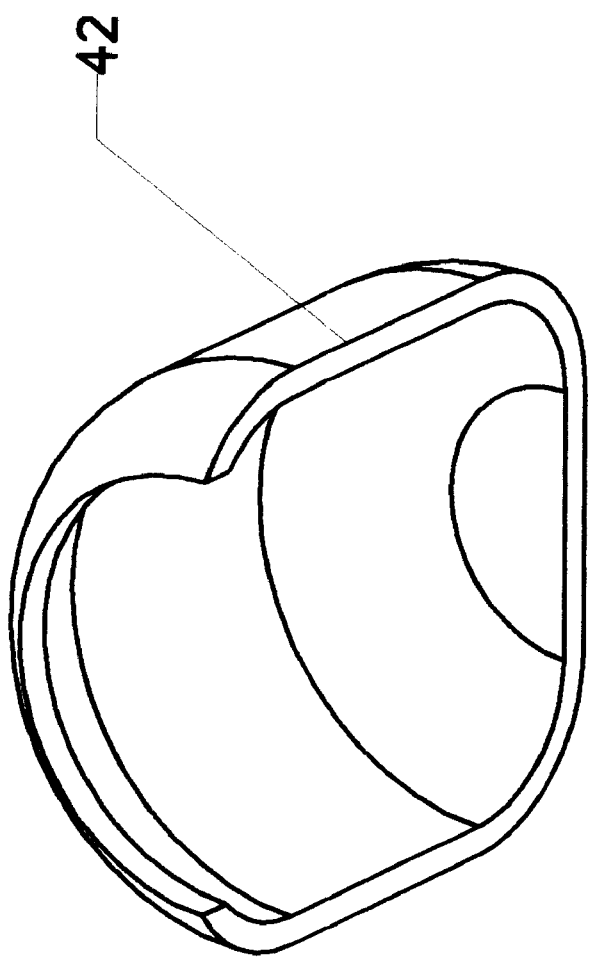
FIG. 7 is an isometric view, showing a unified version of the protector cap.
Figure 8:
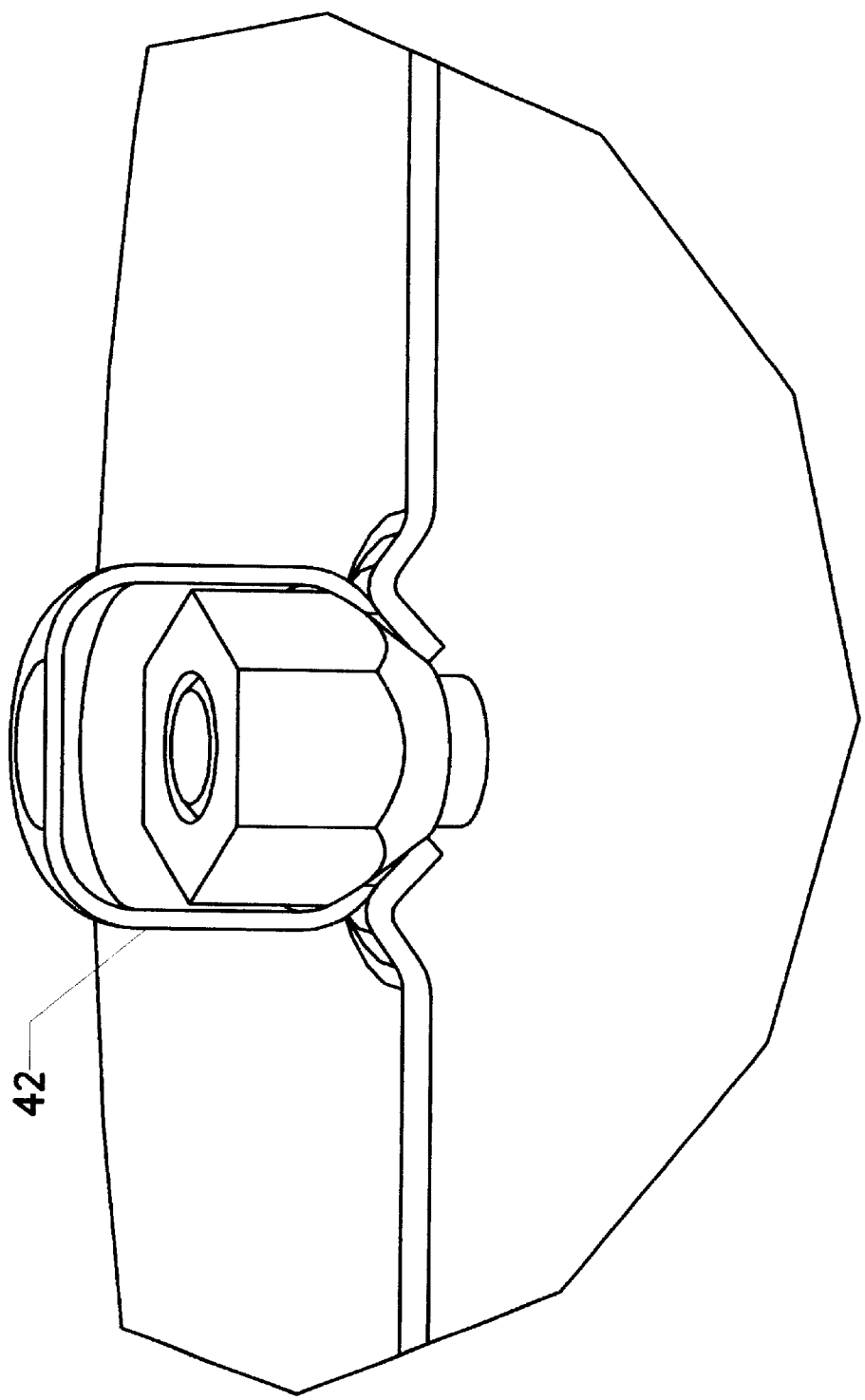
FIG. 8 is an isometric view, showing the unified version on a lug nut.

FIG. 7 illustrates unified protector cap 42. FIG. 7 shows unified protector cap 42 cut in half so that the reader may observe its thin-walled structure. FIG. 8 shows unified protector cap 42 installed on a lug nut. The grease is placed in the interior of unified cap protector 42 in the same fashion as that described with respect to FIGS. 5 and 5B.

Because unified cap protector 42 is simpler and cheaper to produce, it represents the preferred embodiment. However, the reader should understand that for those applications where the exposed shaft length is unknown (and the required length of the protector is therefore unknown), the two-piece version is preferable.

SUMMARY, RAMIFICATIONS, AND SCOPE

Accordingly, the reader will appreciate that the proposed invention significantly inhibits corrosion in a nut threaded onto a shaft. The invention has further advantages in that it:

1. Will accommodate a wide variety of nuts and shafts;
2. Does not require an exposed portion of thread for securing itself in place;
3. Does not require the use of the use of springs or specialized tools to be locked in place; and
4. Effectively protects against corrosion, especially following water immersion.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A device allowing a user to inhibit the corrosion of a nut and the exposed portion of a threaded shaft extending beyond said nut when said nut is threaded onto said threaded shaft, comprising:

a. an inner portion, having a closed first end, and an open second end, and a solid side wall connecting said first end and said second end, and wherein said first end contains an opening sized to slip over and frictionally engage said nut, thereby holding said inner portion to said nut;

b. an outer portion, having an open first end and a closed second end, and a solid side wall connecting said first end and said second end, wherein said outer portion is sized to slidably engage said inner portion by slidably engaging said open first end of said outer portion with said open second end of said inner portion, so as to form a hollow interior within said inner portion and said outer portion having a length which is variable, depending on how far said user pushes said outer portion into said slidable engagement with said inner portion; and c. a highly viscous, corrosion-inhibiting liquid, placed within said hollow interior so as to coat and protect said nut and said exposed portion of said threaded shaft, wherein said liquid is forced around said nut and said shaft as said user pushes said outer portion further into said slidable engagement with said inner portion.

2. The device as recited in claim 1, wherein said corrosion-inhibiting liquid is grease.

3. The device as recited in claim 1, wherein said corrosion-inhibiting liquid contains silicon.

* * * * *